United States Patent [19]
Best

[11] 3,768,264
[45] Oct. 30, 1973

[54] METHOD FOR SUPPRESSING THE FORMATION OF ICE IN NATURAL OR MAN-MADE BODIES OF WATER

[75] Inventor: John S. Best, Midland, Mich.

[73] Assignee: The Dow Chemical Company, Midland, Mich.

[22] Filed: July 3, 1972

[21] Appl. No.: 268,468

[52] U.S. Cl. ............... 61/1 R, 126/271, 165/45
[51] Int. Cl. ............................................ E02b 3/00
[58] Field of Search ............... 61/1 R; 62/260, 240; 165/45, 30; 126/271

[56] References Cited
UNITED STATES PATENTS

| | | | |
|---|---|---|---|
| 3,195,619 | 7/1965 | Tippmann | 62/260 X |
| 3,618,569 | 11/1971 | Baer | 61/1 R X |
| 3,660,983 | 5/1972 | Gill | 61/1 R |
| 3,681,927 | 8/1972 | Duc et al. | 61/1 R X |

Primary Examiner—Mervin Stein
Assistant Examiner—Philip C. Kannan
Attorney—William M. Yates et al.

[57] ABSTRACT

A method for suppressing the formation of ice in natural or man-made bodies of water such as lakes, rivers, sounds, straits, bays, shipping canals, shipping locks, harbors, and the like. The method is particularly useful in areas where ice breakers or the like cannot be efficiently operated. The method provides for direct replacement of heat lost to the atmosphere during the winter season by the use of heat transfer means such as permanent heat transfer apparatus located in and/or adjacent the sides of canals or rivers to prevent natural bridging of ice formations in the same or by the use of a traveling heat exchanger disposed in a barge, scow and the like.

5 Claims, 3 Drawing Figures

METHOD FOR SUPPRESSING THE FORMATION OF ICE IN NATURAL OR MAN-MADE BODIES OF WATER

BACKGROUND OF THE INVENTION

1. Field of the Invention

This invention relates to a method of suppressing the formation of ice in natural or man-made bodies of water, with particular reference to the use of heat transfer means for direct replacement of heat lost to the atmosphere during cold winter season when the air temperature is below that necessary for the formation of ice in said bodies of water.

2. Description of the Prior Art

Means for providing extended or possibly winter-long navigation for commercial shipping in water-way systems located in cold climate areas becomes an increasingly desirable factor as the systems are developed for man's use. This is particularly true in view of the relatively high cost of land based commercial shipping systems.

Ice begins to form when the air temperature is well below freezing and the water temperature is close to freezing. The most favorable conditions for ice formation are a clear, cold night with little or no wind. Ice sheets form first in sheltered areas such as harbors or bays. Whether an ice cover forms or does not form across a river or canal depends on the temperature of the air, the temperature of the water, the velocity of the wind, and the velocity and turbulence of the water. In any event, once an uncontrolled ice cover has formed, continued air temperatures below the freezing point of water will cause the ice cover to grow larger and thicken to the point where continued navigation by commercial shipping is impossible.

Extension of the navigation season or possible winter-long navigation requires maintenance of bays, harbors, and canals, locks or rivers connecting larger bodies of water. In larger bodies of water away from shore areas, the winter ice cover is rather thin or discontinuous and can be easily traversed by commercial ships. It is in bays, harbors, shipping locks, canals and rivers that thick ice covers pose a major problem. Icebreakers have been used to keep bays, harbors, canals, locks and rivers open, but repeated passages in the same track can cause weakening and damage to side retaining walls and shore areas. In addition, certain restricted areas cannot be reached with ice breakers. Bubbler systems for airlifting warm bottom waters to the surface and dusting techniques to prevent ice cover formation have been used with varying degrees of success but are expensive to maintain and sensitive to changes in weather and water conditions.

SUMMARY

In general, the present invention provides a method for suppressing the formation of ice in natural or man-made bodies of water such as lakes, rivers, sounds, straits, bays, shipping canals, shipping locks, harbors and the like. The method is particularly useful in areas where ice breakers or the like cannot be efficiently operated.

The method provides for the direct replacement of heat lost to the atmosphere from a body of water during cold seasonal days when the air temperature is below that necessary for the formation of an ice cover on said body of water. This replacement of heat results in maintaining the upper layer of water in the body of water just above freezing, thus suppressing the formation of an ice cover therein. By relating heat losses to differences in temperature between air and water, the rate of transfer of heat between surfaces of various bodies of water and the atmosphere can be established with a fair degree of accuracy. It has been found that this rate may be taken at about 95 British Thermal Units (B.T.U.), transferred per day per square foot of water surface per degree fahrenheit, and is independent of the surface character of the body of water in question, that is, the surface of rapids, the surface of lakes, and the surface of smooth sections of canals or rivers all have about the same cooling coefficient or ratio of heat transfer.

The present invention takes advantage of low level thermal energy sources by using liquid compositions to store heat near the body of water in which it is desired to suppress the formation of an ice cover. The compositions freeze substantially above 0°C. (32°F.) and have relatively large latent heats of fusion associated with their melting and freezing phase change, which heat can be transferred to the surface layer of the body of water by heat transfer means. Heat transfer apparatus may be utilized which is of a permanent type located in retaining side walls and/or in the top layer of water adjacent the sides of a body of water to prevent natural bridging of an ice cover on the same or may be a traveling heat exchanger disposed in a barge, scow or the like which moves along a desired path in a body of water. When a traveling heat exchanger is used such as a barge or scow, it is necessary to utilize intermediate compositions which have freezing temperatures substantially above 0°C. (32°F.) but below that of the compositions which are used to store heat near a body of water. By utilizing the release of the relatively large latent heats of fusion of the compositions when they freeze coupled with the temperature differencial driving forces from the freezing temperature of the storage compositions to the freezing temperature of the intermediate compositions, if used, and then to the water which is just above freezing, a large heat transfer can be accomplished from the heat storage compositions to a body of water.

Many compositions useful in the present invention are described in a copending application, Ser. No. 268,465, filed July 3, 1972, entitled "Aqueous Organic Heat-Sink Fluids" by Ewart C. Clarke and David N. Glew, which application is herein fully incorporated by reference. This copending application, Ser. No. 268,465, is assigned to the same assignee as is the present invention. The compositions described in the copending application are single-phase solutions comprising water and at least one organic component which are mixed in proportions such that a homogeneous, crystalline, ice-like solid hydrate is formed upon freezing. The aqueous organic compositions have latent heats of fusion in the order of about 140 B.T.U. per pound. Examples of compositions found in the copending application which are particularly useful in the present invention are mixtures comprising 1 mole of pinacol and six moles of water which composition freezes at about 45°C. (113°F.), and one mole of butane-2,3-diol and 6 moles of water which composition freezes at about 14°C. (57°F.). Another beneficial property of many of the organic compositions described is a relatively low percent expansion or contraction of the same during freezing which significantly reduces mechanical stress on their encapsulating structures.

The thermal energy source utilized to regenerate or melt the heat storage compositions can be provided in numerous ways as, for example, from condenser water of steam power plants, nuclear energy power reactors, solar energy, exhaust gases or cooling water of deisel engines or the like and direct heating with fossil fuels. The thermal energy sources may also be used in combination as, for example, where solar energy, used as the primary source to regenerate or melt the storage compositions, is supplemented with fossil fuel heat during peak loads when the available solar energy is inadequate.

BRIEF DESCRIPTION OF THE DRAWINGS

The objects and advantages of the present invention are even more apparent when taken in conjunction with the accompanying drawings in which like characters of reference designate corresponding materials and parts throughout the several views thereof, in which.

DESCRIPTION OF THE PREFERRED EMBODIMENTS

The following description illustrates the manner in which the principles of the invention are applied but are not to be construed as limiting the scope of the invention.

Figure 1:
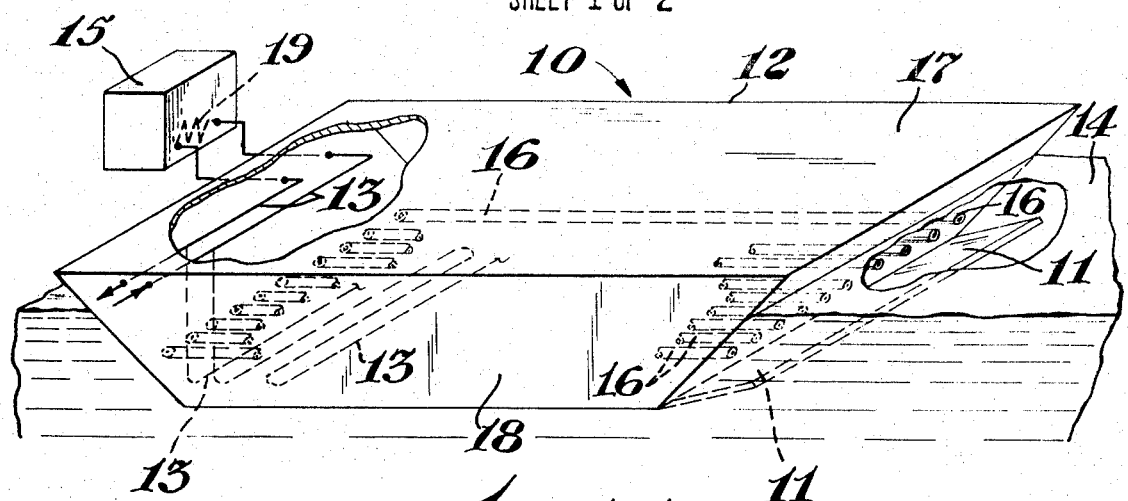
FIG. 1 is a schematic representation of a barge constructed as a traveling heat exchanger according to principles of the present invention.

More specifically referring to FIG. 1, a traveling heat exchanger 20 in the form of a self propelled barge 12 which is utilized to transfer heat to the top portion of a body of water 14 is illustrated. The barge 12 has heat exchanger conduits 16 through which water from the body of water 14 passes and absorbs heat. Barge 12 is substantially filled with an aqueous organic composition 18 comprising 1 mole of butane-2,3-diol and 6 moles of water which freezes at about 14°C. (57°F.) and has a latent heat of fusion of about 140 B.T.U. per pound. The barge 12 also includes a cover 17, a flow control device 11 to control the flow of water through conduits 16, a heat regeneration unit 13, only partially represented to avoid unnecessary detail, which is used to supply heat from an external source to the composite 18, and a deisel engine 15 used to drive the barge 12. The cooling system 19 of the deisel engine 15 is tied into the regeneration unit 13 in order to take advantage of the waste heat generated in the same by transferring it to the composition 18. Other conventional details of the barge 12 such as a cabin, steering mechanism, signal lights, anchors and the like are not shown so that the more important functional elements can be clearly illustrated. The barge 12 and other functional elements therein can be made from the usual construction materials such as steel.

Figure 2:
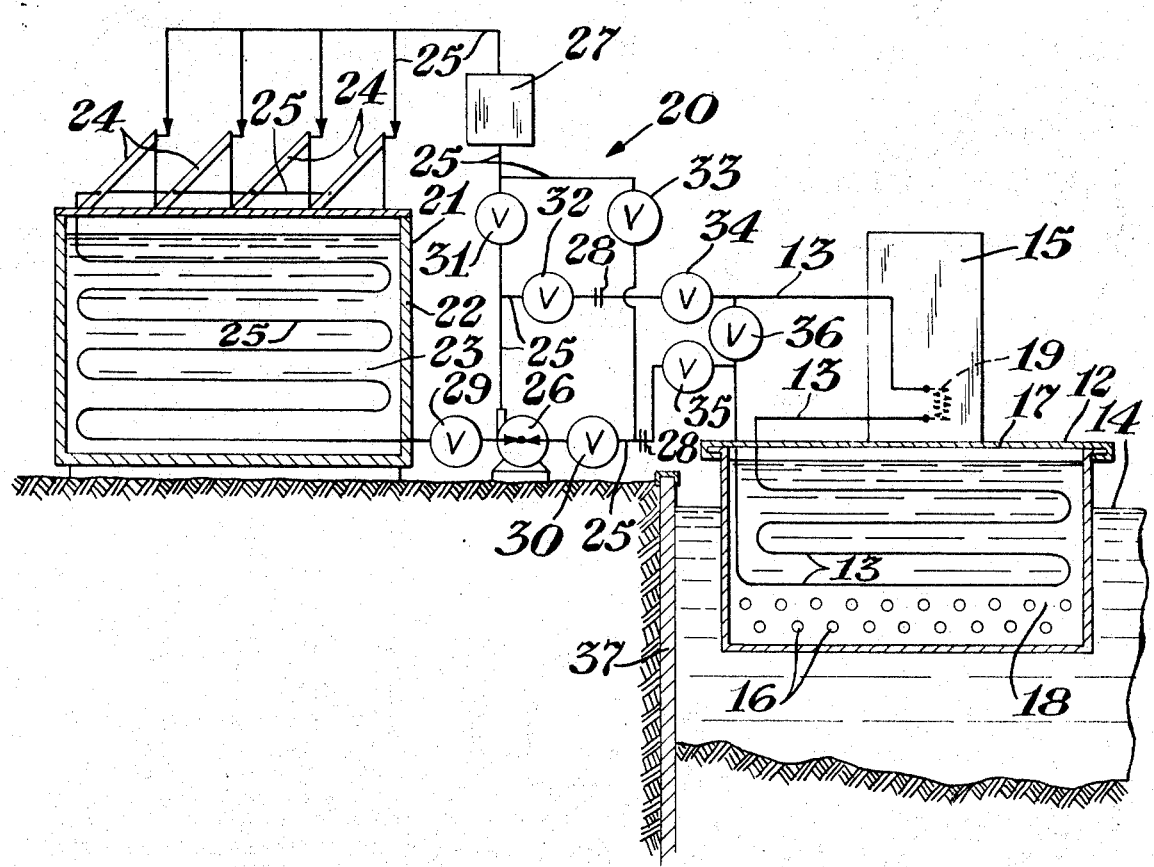
FIG. 2 is a cross-sectional schematic representation of a large heat storage unit and regeneration system, and a heat exchanger barge illustrating the method of transferring heat from the storage unit to the barge.

Referring now to FIG. 2, a heat storage unit 20 which is used to supply heat to the barge 12 is illustrated. The reference numerals illustrating the parts of barge 12 are the same as shown in FIG. 1. The storage unit 20 includes a tank 21 which has insulated walls 22 (insulation not shown) to prevent excess heat loss to the atmosphere during cold weather. The tank 21 is substantially filled with an aqueous organic composition 23 comprising 1 mole of pinacol and 6 moles of water which freezes at about 45°C. (113°F.) and has a latent heat of fusion of about 140 B.T.U. per pound. The heat storage unit 20 also includes solar energy collectors 24 as the primary means for accumulating stored heat in composition 23, a secondary thermal energy unit 27 such as a fossil fuel furnace to supplement the solar energy collectors 24, heat transfer lines 25, a centrifical pump 26, couplings 28 and valves 29-33.

The present invention is based on a principle of storing large quantities of heat near its point of use in the form of latent heat of fusion of the compositions 18 and 23. What this means is, that in carrying out the present invention, the compositions 18 and 23 are allowed to freeze, thus releasing their relatively large latent heats of fusion which are introduced into and/or near the area necessary to suppress ice cover formations on the body of water 14. Of course, the compositions 18 and 23 also supply heat from their liquid phases when utilized at temperatures in excess of their freezing points, but the quantity supplied would generally be small in comparison with that supplied by their latent heats of fusion. In addition, the freezing temperatures of the compositions 18 and 23 are sufficiently high to provide an adequate driving force differential temperature to accomplish the require heat transfer.

Heat should be stored in composition 23 during warm weather when the air temperature is above 0°C. (32°F.). The number and size of the solar energy collectors 24 and the secondary thermal energy unit 27 will depend on the amount of heat which must be stored, but, in any event, should be sufficient to melt the composite 23 before cold weather sets in when the air temperature is below 0°C. (32°F.). The heat is transferred from the collectors 24 and unit 27 by an intermediate transfer fluid, such as a common glycol-water solution, disposed in transfer lines 25. During storing of heat in composition 23, valves 30, 32 and 33 are closed and valves 29 and 31 are open. The centrifical pump 26 then continuously pumps the transfer fluid through transfer lines 25 moving the heat from collectors 24 and thermal energy unit 27, if used, into the composition 23.

During the cold weather season, heat is transferred from the barge 12 to the water adjacent the surface of the body of water 14 until the composition 18 is completely frozen. The barge 12 is then moved into position adjacent the retaining wall 37 of the body of water 14 and coupled to the heat storage unit 20 through couplings 28. The composition 18 is then regenerated or melted by transferring heat through transfer lines 25 and regeneration unit 13. To accomplish this, valves 29, 32, 33, 34 and 35 are opened and valves 30, 31, and 36 are closed. Thereafter, pump 26 continuously pumps the intermediate transfer fluid through transfer lines 25 and the regeneration unit 13 until sufficient heat has been transferred to melt composition 18. The valve procedure is reversed to place barge 12 back in operation on the body of water 14.

Figure 3:
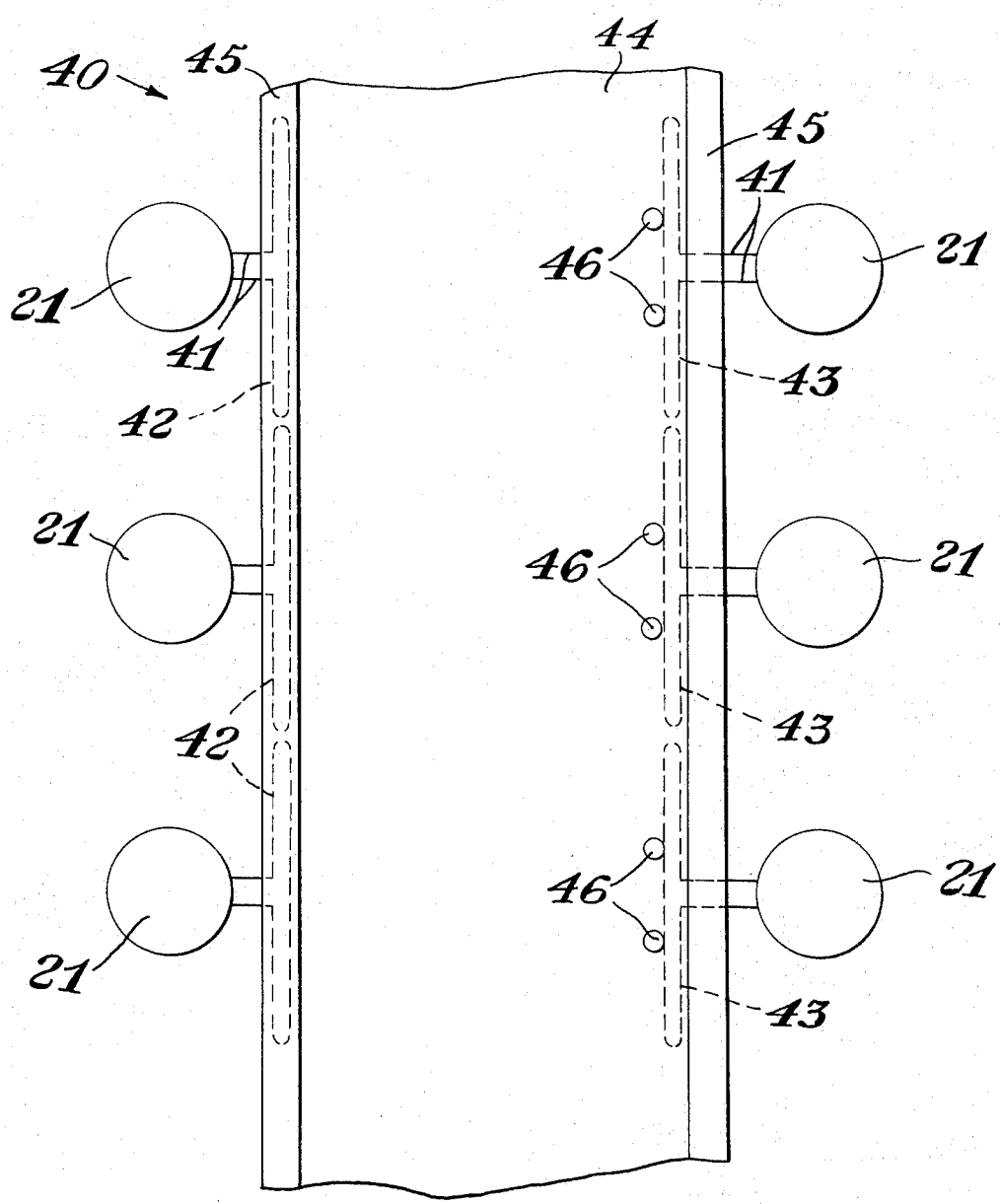
FIG. 3 is a partial plan view illustrating a canal in which ice cover formation is suppressed by direct transfer of heat from a heat storage unit to heat exchanger means in the retained side walls and in the water adjacent said side walls.

Referring now to FIG. 3, a modification of the present invention incorporating permanent heat transfer systems in a partial section of a shipping canal 40 is illustrated. This modification provides for the use of permanent heat exchangers 42 and 43 located in retaining side walls 45 or in the top layer of water 44 adjacent the side walls 45, respectively, to prevent natural bridging of an ice cover between the side walls 45. Heat storage tanks 21 of the same type shown in FIG. 2 and direct transfer lines 41 are used to transfer heat to the heat exchangers 42 and 43. Piles 46 are included to protect heat exchangers 43 from damage by ships passing through the canal 40. By preventing the formation of natural bridging between the retaining side walls 45, any ice cover that forms in the canal 40 will be carried by the current of water 44 into larger connecting bodies of water where it can be easily traversed by ships or, if necessary, broken up with an ice breaker.

While certain representative embodiments and details have been shown for the purpose of illustrating the invention, it will be apparent to those skilled in the art that various changes and modifications can be made therein without departing from the spirit and scope of the invention.

What is claimed is:

1. A method for suppressing the formation of ice in a natural or man-made body of water, comprising the steps of:
    a. storing heat near said natural or man-made body of water from at least one thermal energy source, said heat being stored in a liquid composition having a freezing temperature substantially above that necessary for the formation of ice in said body of water; and
    b. transferring said stored heat into a portion of water adjacent the surface of said body of water in sufficient amount to substantially prevent or suppress the formation of ice in said body of water during cold seasonal weather when the air temperature is below that necessary for the formation of an ice cover on said body of water.

2. The method of claim 1 wherein said liquid composition freezes during said heat transfer step releasing a relatively large latent heat of fusion to be transferred.

3. The method of claim 2 wherein said composition is regenerated or melted after freezing by heating with said thermal energy source.

4. The method of claim 1 wherein said heat is transferred along a path in said body of water by a traveling heat exchanger moving along said path, said traveling heat exchanger utilizing an intermediate composition to temporarily hold said transferred heat before transferring it to said body of water, said intermediate composition having a freezing temperature substantially above that necessary for the formation of ice in said body of water but below that of the composition used to store heat near said body of water.

5. The method of claim 1 wherein said heat is transferred to a position in said body water adjacent the sides thereof by a permanent heat exchanger to prevent natural bridging of an ice cover on said body of water.

* * * * *